Oct. 9, 1945.  R. C. BLAYLOCK  2,386,288
LANDING GEAR AND WING SLOT CONTROL
Filed May 2, 1941  2 Sheets-Sheet 1

INVENTOR
RAYMOND C. BLAYLOCK
BY
ATTORNEY

Oct. 9, 1945.  R. C. BLAYLOCK  2,386,288
LANDING GEAR AND WING SLOT CONTROL
Filed May 2, 1941  2 Sheets-Sheet 2
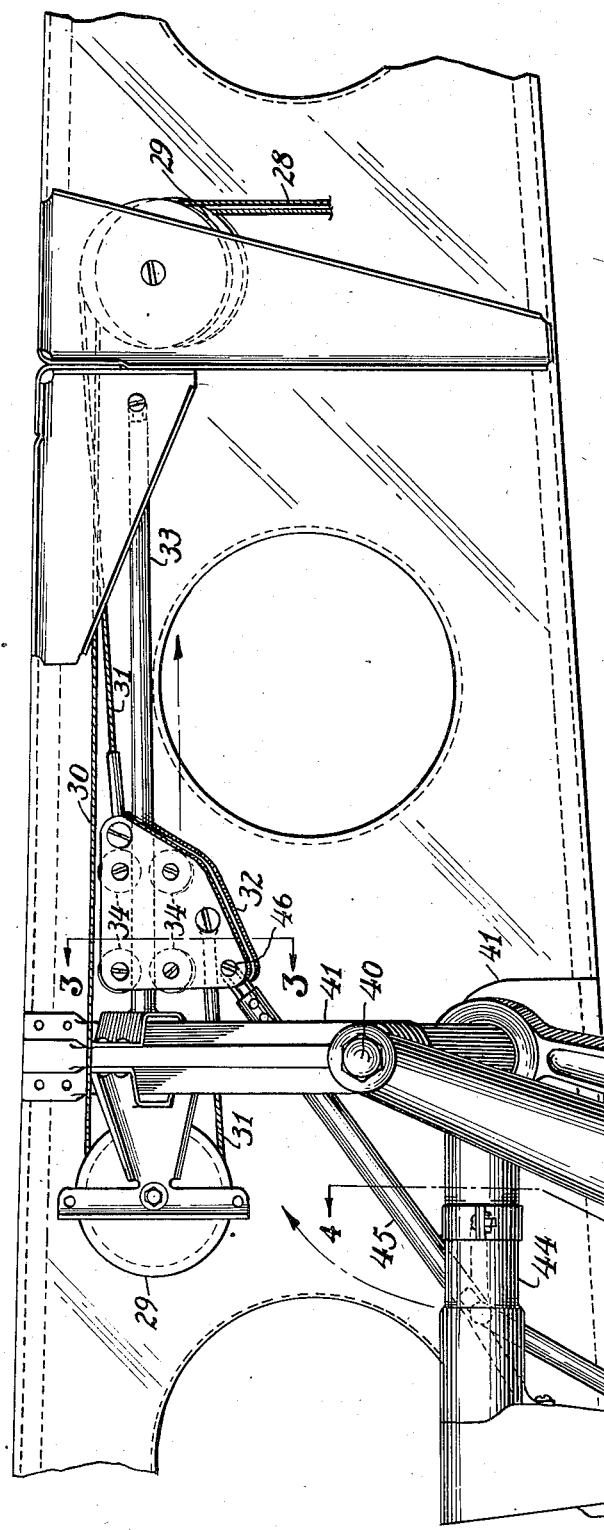
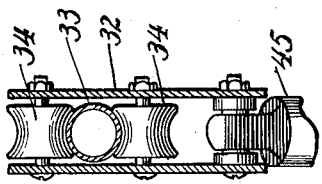
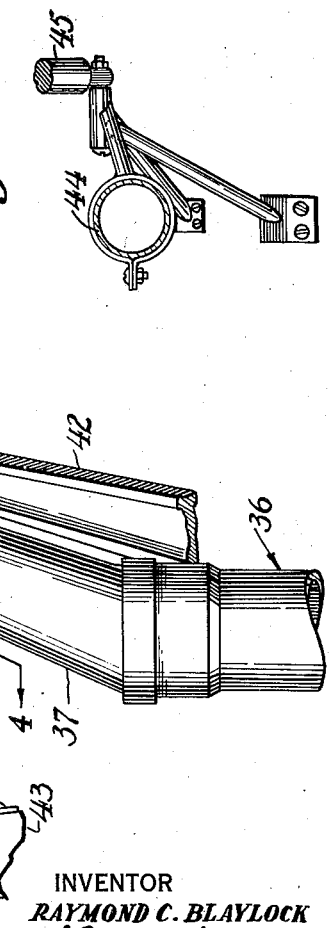
INVENTOR
RAYMOND C. BLAYLOCK
BY
ATTORNEY Patented Oct. 9, 1945

2,386,288

UNITED STATES PATENT OFFICE 2,386,288

LANDING GEAR AND WING SLOT CONTROL

Raymond C. Blaylock, Kenmore, N. Y., assignor to Curtiss-Wright Corporation, a corporation Application May 2, 1941, Serial No. 391,465

4 Claims. (Cl. 244—102)

This invention relates to aircraft and is particularly concerned with control means therefor. An object of the invention is to provide a form of slot forming auxiliary airfoil which will have maximum effectiveness when used in connection with tapered aircraft wings. A further object is to provide a slot forming auxiliary airfoil which, when moved to the slot forming position, will form a tapered slot adjacent the leading edge of a tapered aircraft wing. Still another object of the invention is to provide, in an aircraft equipped with a retractable landing gear, operating means for a lift increasing device which is coordinated with the landing gear, whereby lift increasing effect will be secured when the landing gear is extended, and whereby normal lift of an aircraft wing will be secured when the landing gear is retracted. A further object is to provide a movable slot forming auxiliary airfoil in an aircraft wing whose operation is controlled by retraction and extension of the aircraft landing gear.

Further objects of the invention will become apparent in reading the detailed description below in connection with the drawings, in which:

Fig. 2 is an enlarged front elevation of part of the mechanism of the invention;

Fig. 3 is a section on the line 3—3 of Fig. 2; and

Fig. 4 is a section on the line 4—4 of Fig. 2.

Figure 1:
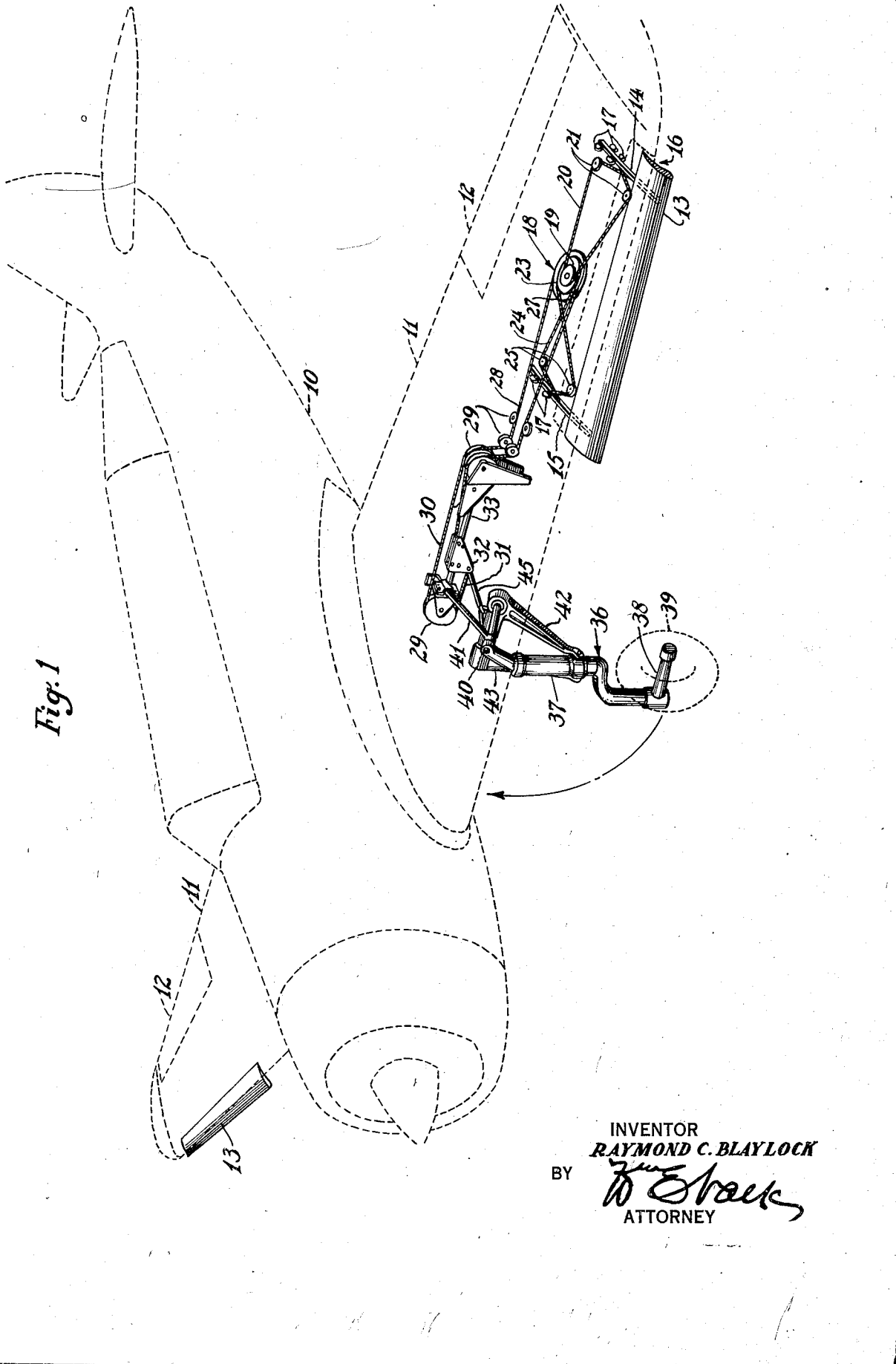
Fig. 1 is a perspective view of the invention in association with an aircraft.

Retractable landing gears, per se, are well known in the art. Likewise, the use of slot forming auxiliary airfoils at the leading edge of an aircraft is known. Such airfoils have been constructed either for automatic or manual operation—that is, the airfoil may be moved to and from the slot forming position either automatically by the aerodynamic action of the slipstream on the airfoil, or it may be provided with control means by which it can be opened and closed at the will of the pilot. The greatest utility for so-called "leading edge slots" is to increase lift and to increase good lateral control at or near the stalling speed of an airplane. Modern types of dive bombers present a good example of airplane in which partial span leading edge slots have considerable utility. Dive bombers are required to operate through an extreme speed range from terminal velocity without aerodynamic brakes of the order of 500 miles per hour to stalling speed of the order of 70 miles per hour throughout which speed range, of course, good lateral control is essential. Furthermore, such airplanes are subject to severe structural loading since they must be capable of withstanding maximum accelerations up to 14g throughout that part of the speed range where such accelerations are possible. Where leading edge slots are used to increase lateral control at low air speeds, it is almost essential to limit the extension of the slot forming auxiliary airfoils to the low end of the speed range to confine the loading therein to a reasonable value. If the airfoils were allowed to open in the high speed range, they would be likely to fail structurally unless they were built so strongly that their weight would become excessive. Accordingly, since aircraft of the character above mentioned are almost invariably equipped with retractable landing gears, the invention contemplates the interconnection of the slot forming airfoil with the landing gear so that both may be retracted and extended simultaneously. The landing gear, when extended, forms a potent source of parasite drag so that high speed operation cannot be attained while the landing gear is extended. Thus, the slot forming airfoil is inhibited from extension during high speed operation of the airplane since, in order to extend the landing gear, the speed of the aircraft must be low enough to allow the apparatus, either power or manual, by which the landing gear is operated, to function. The above would pertain to the landing operation. After take-off, high speed may not be attained while the landing gear is extended and during this interval the slot forming airfoil may safely be opened. Retraction of the landing gear automatically closes the slot and locks the slot forming airfoil in closed position and, with the decreased drag due to the folded landing gear, high speed operation may then take place.

Specifically, I show an aircraft comprising a fuselage 10 provided with laterally extended wings 11 each of which is provided with ailerons 12 and with a slot forming auxiliary airfoil 13 substantially coextensive in span with, and lying forward of, the ailerons 12. Each airfoil or slat 13 is secured to spaced arms 14 and 15 extending within the wing 11 and guided in suitable means 17 within the wing. It should be here noted that the wings 11 are tapered both in planform and thickness and each slat 13 is correspondingly tapered. To secure maximum effectiveness of the slot 16 which is formed when the slat 13 is disposed forwardly of the leading edge of the wing, such slot 16 should be tapered in consonance with the taper of the wing and of the slat. Still, when the slat 13 is retracted, it should lie closely against the wing leading edge throughout its span. Thus, the inboard end of the slat 13 should be extendable a greater distance than the outboard end in order to form the tapered slot. To accomplish this, a three-sheave pulley 18 is journalled in the wing, the smaller sheave 19 thereof having a cable 20 reeved thereover, this cable passing over idler pulleys 21 to the arm 14 to which the cable ends are secured. The second sheave 23 of the pulley 18, larger than the sheave 19, has a cable 24 reeved therearound, which cable is crossed before it passes over idler pulleys 26, after which the cable ends are secured to the arm 15. The sheaves 19 and 23 coordinate the extension of the arms 14 and 15, so that joint movement of both ends of the slat 13 is assured, and, by the difference in diameter of the sheave 19 and 23 the inboard end of the slat may move concurrently with, but through a greater distance than, the outboard end of the slat.

A third sheave 27 of the pulley 18 comprises a control sheave, a cable 28 being reeved thereover and passing over idler pulleys 29 to provide an upper cable run 30 and a lower cable run 31. The lower run 31 of the cable includes the cable ends which are secured to a transversely movable fitting 32 slidable along a guide rod 33 on pulleys 34 journalled in the fitting 32.

A landing gear 36 is shown as comprising a main strut 37 carrying an axle 38 at its extreme end upon which is journalled a wheel 39. The upper end of the strut 37 is provided with a fore-and-aft tilted pivot axis 40, the strut being secured in bearings 41 and 41' for substantially transverse swinging between an extended position wherein the landing gear depends vertically downward as in Fig. 1, and a retracted position in which the strut lies substantially horizontal within the confines of the wing 11. The strut 37 swings inwardly toward the fuselage 10 and when retracted, the wheel 39 lies substantially flush with the lower surface of the wing. The strut 37 is braced by links 42 and 43 which move therewith about the pivot axis 40, said links 42 and 43 being connected at their upper ends by a member 44 to which is clevised a rod 45, the other end of the rod 45 being clevised to the fitting 32 at 46. Means for extending and retracting the landing gear 36 are not shown but, since various such means are well known in the prior art, it is obvious that swinging of the landing gear about its pivot may be accomplished by known mechanisms such as a hydraulic motor, a cable mechanism or the like. When the landing gear is moved from its extended position to its retracted position, the member 44 swings clockwise thereby moving the fitting 32 from left to right. Conversely, when the landing gear is extended, the member 44 moves counterclockwise and draws the fitting 32 from right to left. Through the cable connection between the fitting 32 and the sheave 27, it is apparent that rightward movement of the fitting 32 causes retraction of the slat 13 against the leading edge of the wing, whereas leftward movement of the fitting 32 causes extension of the slat 13 from a position adjacent the wing leading edge to a position forward thereof by which the slot 16 is formed.

The cable connections from the landing gear to the wing slat form a sturdy and simple arrangement for coordinating movement of the slat with movement of the landing gear but it is apparent that the mechanism shown is susceptible to various changes as dictated by the desires of the designer and the disposition of the slat and landing gear components in the aircraft.

The system of slat operation above described has the following advantages:

(a) The slats are locked closed by the landing gear during terminal velocity dives and pull-outs, eliminating those excessive structural loads on the wing structure which would occur if the slats were permitted to open. Such loads, particularly when applied near the wing tip in a cantilever monoplane would be critical.

(b) Locks such as hooks or latches for the slats are eliminated. Control and synchronization of such locks comprise a major design problem, particularly when constructed for loads of the magnitude encountered on slats for dive bombers.

(c) Speeds at which it is desirable to operate the aircraft with wheels extended are in a low range, usually not over 150 M. P. H. Control of the slats by interconnection with the landing gear allows the slats to be constructed for low structural loads when they are in their operative position.

(d) Control of the slats by interconnection with the landing gear eliminates one control from the pilot's cockpit.

(e) Automatic slats or separate manually controlled slats would present a considerable hazard in operation of dive bomber types of aircraft.

(f) Since the landing gear is normally provided with means for securely locking it in either the extended or retracted position, such locks serve the slats as well as the landing gear when these mechanisms are interconnected for joint operation.

(g) Interconnection of the landing gear with the slat makes available a large aerodynamic force, acting upon the slat at low flight speeds, which may be utilized for assisting in extending the landing gear, thus augmenting the power system for landing gear operation or potentially being available for landing gear extension in event of a failure of the normal landing gear operating system. By pulling the airplane nose up so that the angle of attack is high at low speed, aerodynamic forces acting upon the slat tend to extend same thereby reacting upon the landing gear and tending to extend the latter.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In aircraft comprising a wing and a retractable landing gear, a slot forming movable auxiliary airfoil at the wing leading edge, and means interconnecting said airfoil and landing gear operable to effect concurrent extension of the landing gear and the airfoil to slot forming position and to effect concurrent retraction of the landing gear and the airfoil.

2. In aircraft having a retractable landing gear, a wing, an extendible and retractable slot forming auxiliary airfoil on the wing leading edge, and mechanism operable to extend and retract the landing gear and airfoil simultaneously, said mechanism comprising means interconnecting said landing gear and airfoil to enforce said simultaneous movement.

3. In aircraft having a retractable landing gear, a wing, and an extendible and retractable slot forming auxiliary airfoil on the wing leading edge, mechanism to extend and retract the landing gear, and means interconnecting said landing gear and auxiliary airfoil responsive to landing gear extension and retraction to extend and retract, respectively, the auxiliary airfoil.

4. In aircraft having a retractable landing gear, a tapered wing having a tapered auxiliary airfoil at its leading edge, means to extend and retract the landing gear, and means operated by the landing gear upon extension and retraction thereof to respectively extend and retract the airfoil relative to the wing leading edge, said airfoil when extended forming a slot between itself and the leading edge which is tapered in consonance with the wing and airfoil tapers.

RAYMOND C. BLAYLOCK.